United States Patent [19]

Weiss

[11] Patent Number: 4,955,727

[45] Date of Patent: Sep. 11, 1990

[54] METHOD AND APPARATUS FOR A NON-CONTACT MEASURING OF A TEMPERATURE OF A BODY

[75] Inventor: Hardy P. Weiss, Hütter, Switzerland

[73] Assignee: Martin Lehmann, Wohlen, Switzerland

[21] Appl. No.: 396,913

[22] Filed: Aug. 22, 1989

Related U.S. Application Data

[63] Continuation of Ser. No. 64,464, Jun. 22, 1987, Pat. No. 4,887,229.

[30] Foreign Application Priority Data

Jun. 20, 1986 [CH] Switzerland ............ 2503/86

[51] Int. Cl.$^5$ ............ G01J 5/24; G01J 5/62
[52] U.S. Cl. ............ 374/124; 250/352; 364/557; 374/128; 374/133
[58] Field of Search ............ 374/132, 133, 129, 170, 374/128, 141; 252/352; 364/571, 557; 356/43

[56] References Cited

U.S. PATENT DOCUMENTS

| | | | |
|---|---|---|---|
| 3,057,200 | 10/1962 | Wood | 374/132 X |
| 3,293,915 | 12/1966 | Banca et al. | 374/133 X |
| 4,048,500 | 9/1977 | Moore | 250/352 X |
| 4,070,900 | 1/1978 | Engels | 364/571.03 X |
| 4,109,508 | 8/1978 | Fudrajanis | 374/124 X |
| 4,435,093 | 3/1984 | Krause et al. | 374/141 X |
| 4,527,896 | 7/1985 | Irani et al. | 374/133 X |
| 4,634,294 | 1/1987 | Christol et al. | 374/129 X |
| 4,741,626 | 5/1988 | Hashimato | 374/132 X |
| 4,797,840 | 1/1989 | Fraden | 364/557 |
| 4,887,229 | 12/1989 | Weiss | 364/557 |

FOREIGN PATENT DOCUMENTS 2306449 8/1973 Fed. Rep. of Germany ...... 374/133
1226540 3/1971 United Kingdom ............ 374/133

OTHER PUBLICATIONS

EPO Application Publ., No. 0,098,402, published 1/18/84, "Temp. Measuring Apparatus", Noda Tomimitusu, 19 pages.

Primary Examiner—Daniel M. Yasich
Attorney, Agent, or Firm—Antonelli, Terry, Stout & Kraus

[57] ABSTRACT

In order to measure the temperature of a body (3) extensively independently of interference radiation ($\theta_{U1}$), a sensor (1) is provided wherein the radiation ($\theta_3$) of the body (3) is chopped by means of a chopper (5) between the sensor (1) and the body (3). Since extraneous radiation originates predominantly from losses at the sensor (1) as well as from frictional heat of the chopper (5) in case a mechanical chopper (5) is provided, the housing temperature of the sensor (1) is detected for correction purposes on the side of the chopper (5) facing the sensor (1) by means of an additional sensor (13). Around and in the zone of the travel path of the mechanical chopper (5), by means of a third sensor (15), the ambient temperature of the chopper is detected, again for correction purposes.

23 Claims, 4 Drawing Sheets

METHOD AND APPARATUS FOR A NON-CONTACT MEASURING OF A TEMPERATURE OF A BODY

This is a continuation application of Ser. No. 064,464, filed June 22, 1987 and now U.S. Pat. No. 4,887,229.

The present invention relates to a method for the noncontact measurement of a temperature of a body, as well as an arrangement for the noncontact measurement of a temperature of a body.

In noncontact measuring of a temperature originating from heat radiation of a body—this does not the same as body temperature, since the body herein need not be thermally equalized—there is the problem that the ambient radiation can drastically falsify the result of the measurement. This problem, actually a problem of the signal-to-noise ratio, becomes ever more critical if temperatures are to be measured lying only a little above or below ambient temperature, wherein little is to mean yet several 100°.

In order to solve this problem, it is suggested according to the invention
- to chop, by means of a chopper, the heat radiation between the body and a temperature sensor,
- to take into account at least one ambient temperature of the sensor on the side of the chopper facing the sensor in the evaluation of the temperature detected by the sensor.

On account of the fact that the heat radiation between the body and the temperature sensor provided is chopped up, heat radiation pulses detected by the sensor are produced, the amplitude of which is given by two heat radiation components, namely firstly by the ambient radiation on the sensor side of the chopper and secondly by the heat radiation on the side of the chopper facing away from the sensor, which latter radiation is composed of the ambient irradiation at that location and of the body radiation to be detected.

While the ambient radiation on the side of the chopper facing away from the sensor cannot be separated from the body radiation, but, on the other hand, can be reduced to an insignificant extent, for example by a selected minimum distance between chopper and body, and furthermore is practically time-invariant, the ambient radiation on the sensor side of the chopper constitutes a graver problem, especially when considering its chronological change as it occurs after actuation of sensor and chopper, ensuing from electrical feeds as well as, in general, by the chopper output and the fact that mounting elements for sensor and chopper require relatively small-volume spaces wherein temperature fluctuations result in spite of a stable larger-space temperature.

Owing to the fact that, now, at least one ambient temperature of the sensor on the side of the chopper facing the sensor is considered in the evaluation, it is made possible to effect a temperature measurement representative solely for the body radiation, on the one hand even before the partial system on the sensor side of the chopper has become thermally stabilized, which may take, depending on the structure, relatively long time periods, and, on the other hand, likewise independently of the value of thermal stabilization finally assumed by the aforementioned partial system.

As is known, commercially available temperature sensors for the noncontact measurement of heat radiation in a housing are designed as finished components, usually with an integrated amplifier, and in this connection it is furthermore proposed to take into account, as one ambient temperature, the temperature of the sensor housing.

The heat radiation of the sensor housing directly affects the actual sensor, usually a semiconductor chip, integrated into the housing.

Another source of radiation that preferably should not be neglected is the chopper. Due to the work performed by this chopper, especially if a mechanically moved chopper is involved, it acts in the surrounding air as a Joule's brake; in this connection, it is furthermore suggested to take into account, as one ambient temperature, a temperature caused by the work performed by the chopper.

It is furthermore proposed to regulate the temperature of the sensor housing so that it is at a predetermined value, and this can optionally also be done with the temperature produced by the work of the chopper.

If the heat radiation is chopped by means of a mechanically moved chopper, such as by means of a disk, with radiation-impermeable and radiation-permeable segments, then it is suggested to consider, as one ambient temperature, a temperature in the region of the travel path of the chopper.

Although here again the temperature can be predetermined by regulatory means, one must consider that, on account of the bulk of such a mechanical chopper, such a regulation for maintaining temperature equalization over-all at the chopper will become relatively sluggish.

For this reason, it is furthermore suggested that the temperature measured by means of the sensor is corrected as a function of the temperature produced by the chopper.

In this connection, it is furthermore preferred to proceed by multiplying a first signal dependent on the temperature produced by chopper work by a first coefficient; then adding the product to a second coefficient in order to obtain a second signal; then dividing a third signal dependent on the temperature detected by the sensor by the second signal in order to obtain a fourth signal; and adding the fourth signal to the first signal in order to obtain a signal representative for a body temperature or, respectively, body radiation.

Preferably, the sensor output signal, prior to being further evaluated, is averaged over several chopper periods in order to eliminate incidental fluctuations of the sensor output signal.

The above-mentioned coefficients for correcting the sensor output signal based on the temperature produced by chopper work are preferably determined experimentally from at least two measurements, at predetermined body temperatures, and respectively two values of the temperature produced by chopper work, and committed to memory.

As mentioned above, one can speak of body temperature only if the body has been thermally equalized.

On the other hand, temperature measurement on a body that has not been equalized thermally is representative for the thermal energy content of a body volume element lying directly within the region of the measurement.

In order to obtain, in case of relatively large bodies, with the use of such a temperature measurement, an indication of the thermal energy content of a maximally large volume element of the body, it is furthermore suggested that the temperature measurement be conducted by means of the sensor in the zone of an already existing recess at the body, or a recess that has been provided for this purpose, in order to enlarge a body volume element, for the thermal energy content of which the temperature measurement is representative.

Such a recess can be, for example, the opening of a can to be measured as a body, or, in case of bodies not yet exhibiting such a recess, such as metal ingots, a recess is provided, such as in the form of a bore; in this way, the aforementioned temperature measurement becomes representative for the thermal energy content of a substantially larger body volume element inasmuch as the provided recess acts similarly to a structure exhibiting black body radiation, and emits a heat radiation corresponding to the heat content averaged over a relatively large adjoining volume.

If the body is moved relatively to the sensor, such as, for example, on a production line, then it is suggested that the chopper period is chosen to be shorter than the time span during which the recess lies within the sensor measuring range so that, during this measuring period, an adequate number of measuring points is available to be able to perform averaging that eliminates random variables.

The arrangement according to this invention for the noncontact measurement of a temperature of a body comprises, according to the invention
a first temperature sensor,
a heat radiation chopper connected in front of the heat input of the sensor,
at least one further temperature sensor in the zone of the chopper and/or of the first temperature sensor, both on the sensor side of the chopper.

Preferably, the temperature sensor, or a further temperature sensor, is thermally tightly coupled with a housing of the first temperature sensor and/or with the chopper.

In this connection, it is furthermore proposed to connect at least one additional temperature sensor as a control variable pickup into a temperature control circuit for the zone wherein it is located.

A simple construction of the arrangement is obtained by providing that the chopper is a mechanically moved chopper, such as a chopper disk, with a plurality of segments impermeable to heat radiation and segments permeable to heat radiation, and that the temperature sensor, or, respectively, a further temperature sensor, is arranged directly in the region of the path of movement of the chopper.

It has been found that, especially when providing such a chopper, relatively large time periods from one hour to several hours can elapse, due to its frictional work in the surrounding air, until the air ambient around the chopper, and thus also the heat radiation transmitted from the chopper zone to the first sensor, has reached a stable value.

Since it is essential in many applications to be able to perform representative measurements directly after connecting such an arrangement, the above-mentioned arrangement of the additional temperature sensor in the region of the chopper travel path is extremely advantageous; this is so because, by correspondingly considering the time-variable temperature detected by this sensor for the measured result, it becomes possible to effect a representative measurement as early as immediately after connection of the arrangement.

Although, as indicated above, the time-variable behavior of the radiation can be eliminated by the provision of one or several control circuits, the expense therefor is, after all, relatively high, particularly when considering that it is necessary to include, as temperature-adjusting members, heating and/or cooling elements, such as Peltier elements and, furthermore, that such control circuits, as has also been mentioned, are sluggish.

Control circuits can be eliminated basically by providing an evaluating unit receiving the outputs of at least a portion of the temperature sensors and transmitting on the output side a signal representative for the body temperature.

A preferred arrangement of such an evaluating unit for the performance of calculations on the output signal of an additional temperature sensor in the zone of the chopper with the output signal of the first temperature sensor for the body temperature is set forth in claims 19 and 20.

Especially in case, as mentioned above, a recess is provided in a body to be measured, and such bodies are moved relatively to the temperature sensor, it is important to make available a criterion indicating when a temperature measurement with respect to the moving body takes place at the correct location, i.e. in the region of the recess, and when this is not the case. This problem is preferably solved by connecting after the first sensor a threshold-value-sensitive unit the output of which operatively connects the output of the aforementioned first sensor with an output of the arrangement if the value of the sensor output signal lies above or below a predetermined level.

Since, in a body equipped with a recess in the aforementioned sense, only its surface radiation is effective for the measurement, as long as the recess is not as yet located in the measuring range of the sensor, and there is a sudden change once the recess enters the measuring range, the aforementioned, threshold-value-sensitive unit makes it possible to detect the point in time when the aforementioned recess coxes to lie within the measuring range of the sensor.

Preferably, the sensor and the threshold-value-sensitive unit are designed so that response is obtained to a predetermined change in the temperature or, respectively, radiation per unit time, detected by the first sensor; thus, changes in radiation and/or flanks trigger measurement, independently of the prevailing temperature levels.

The invention will be described below by way of example with reference to the drawings wherein.

Figure 1:
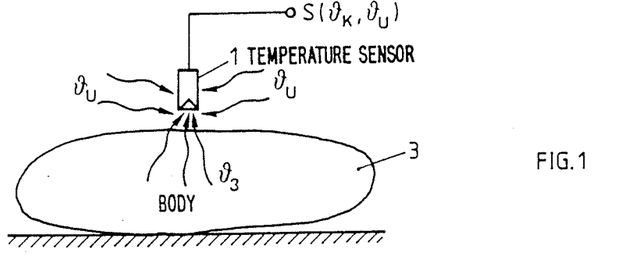
FIG. 1 is a schematic view of the arrangement of a temperature sensor for noncontact measurement of the temperature of a body, with the effects of ambient radiation.

FIG. 1 shows a temperature sensor 1, designed, for example, as a pyroelectric detector and arranged without contact in the zone of a body 3. The sensor 1 usually acts as a thermally electrical transducer and transmits on the output side a signal S, in the illustrated arrangement as a function of a body temperature or radiation $\theta_3$ as well as of the ambient radiation corresponding to a temperature $\theta_U$. If the radiation of the body 3 is not substantially different from the ambient radiation, in that its temperature is, for example, below 100° C., with an ambient temperature of 20° C., then the ambient radiation affects measuring accuracy unduly. This is so, in particular, if the ambient radiation, for reasons that will be described below, is not constant but rather varies with time.

Figure 2A:
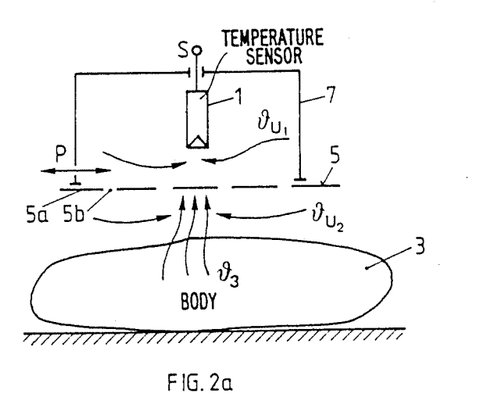
FIG. 2a shows conditions analogous to those in FIG. 1 during chopping of heat radiation between a body and the temperature sensor.
Figure 2B:
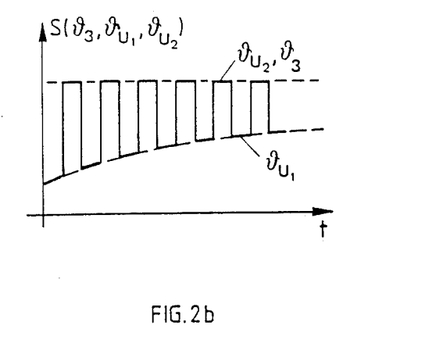
FIG. 2b shows quantitatively the sensor output signal resulting in an arrangement according to FIG. 2a, with the dependencies on the various radiations.
Figure 3:
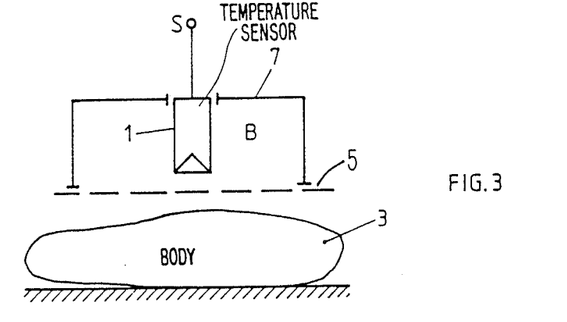
FIG. 3 shows schematically the zone at the sensor-chopper arrangement to be thermally controlled, in an arrangement according to FIG. 2a, FIG. 4 shows, using an illustration according to FIG. 2a, schematically relevant temperature measuring points, for controlling the temperature and, respectively, heat radiation conditions in the zone according to FIG. 3.

According to FIG. 2a, a heat radiation chopper 5 is now disposed, according to this invention, between the body 3 to be measured, having the radiation corresponding to $\theta_3$, and the sensor 1; this chopper is, for example, a mechanical chopper, by means of which segments 5a impermeable to heat radiation are moved through, in alternation with segments 5b permeable to heat radiation, between the sensor 1 and the body 3 as indicated by arrow P. The ambient radiation with respect to chopper 5, on the side of sensor 1, is denoted by $\theta_{U1}$, the ambient radiation with respect to chopper 5, on the side of body 3, is denoted by $\theta_{U2}$. At the output of sensor 1, the signal illustrated in FIG. 2b appears qualitatively. If the radiation between the body 3 and the sensor 1 is interrupted by a segment 5a of chopper 5, then the radiation level detected by the sensor 1 corresponds to the lower hugging curve $\theta_{U1}$ corresponding to radiation $\theta_{U1}$, illustrated in FIG. 2b. If the radiation between the body 3 and the sensor 1 is unimpeded because of a segment 5b, then the detected radiation corresponds to a value resulting from the ambient radiation corresponding to $\theta_{U2}$ and the body radiation $\theta_3$. While the ambient radiation $\theta_{U2}$ on the body side can be reduced by positioning chopper 5 as closely as possible to the body 3, the ambient radiation $\theta_{U1}$ on the sensor side causes substantially more problems in controlling same. Usually, an arrangement as illustrated schematically in FIG. 2a is accommodated in a schematically shown housing 7 in such a way that, when such an arrangement is placed into operation, relatively long periods of time can elapse until the interior of the housing 7 of generally poorly ventilated rooms, and thus the radiation corresponding to $\theta_{U1}$, have become stabilized. This, as indicated in FIG. 2b, leads to a time-variable amplitude characteristic of the output signal S, even if the body radiation corresponding to $\theta_3$ is constant. While the ambient radiation corresponding to $\theta_{U2}$ can, in many instances, be assumed to be constant with adequate accuracy, this is not possible for the radiation corresponding to $\theta_{U1}$, especially during the thermal settling time, a time span that can last several hours. For this reason, it is of great importance for an accurate temperature measurement to know the conditions on the sensor side of the chopper 5, to consider such conditions, or to affect such conditions, so that, as schematically illustrated in FIG. 3, constant radiation conditions prevail within the sensor-side zone B as determined by a housing 7 or, if this is not the case, the most essential radiation contributions from this space are known and can be taken into account when evaluating the detector output signal S.

Figure 4:
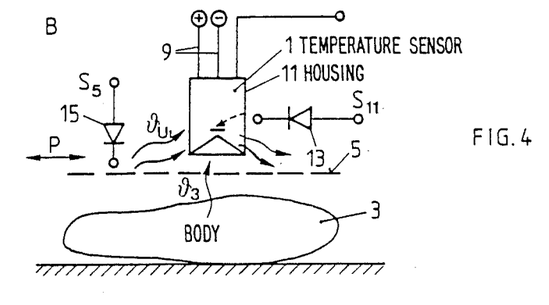

Primarily two sources of radiation are responsible for the ambient radiation corresponding to the temperature $\theta_{U1}$ on the sensor side of the chopper 5, firstly, the sensor 1 with conventionally integrated amplifier, customarily supplied as shown in FIG. 4 by way of supply cables 9 with electricity, and thus its housing 11, and, secondly, the chopper 5, particularly if a mechanical chopper is involved, as illustrated by arrow P. While the housing 11 of the integrated sensor 1 radiates toward the inside onto the pyrotechnically sensitive semiconductor element, the mechanical motion of the chopper 5 produces heat of friction in the ambient air, which can lead, in the more or less closed, relatively small-space system with mechanical mounting elements and a casing, analogously to the housing 7 of FIGS. 2a and 3, to several degrees' rise in temperature after activating the arrangement, within the first few hours.

Therefore, as shown in FIG. 4, according to this invention, a first correctional temperature sensor 13 is closely coupled thermally with the sensor housing 11, and an additional correctional temperature sensor 15 is coupled with the chopper 5, in case of a mechanical chopper, so that the sensor 15 is located in the immediate vicinity of the path of motion of the chopper 5 in such a way that the sensor measures the temperature of the ambient air of the chopper.

The sensors 13 and 15, usually designed as thermoelectric transducers, produce correspondingly signals $S_{11}$ representative for the housing temperature and, respectively $S_5$ representative for the ambient air temperature of the chopper 5.

Figure 5:
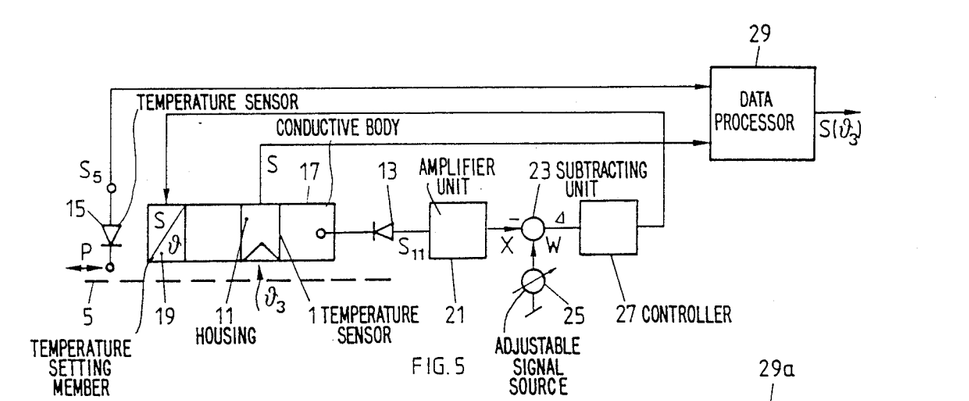
FIG. 5 shows an arrangement according to FIG. 4 with temperature control of the housing for the body radiation sensor, and with correction of the measuring signal as a function of radiation produced by chopper work.

FIG. 5 shows schematically a first version how the signals of sensors 1, 13 and 15 are evaluated.

The measuring sensor 1 is embedded, as shown schematically, in a relatively large-volume, thermally well conductive body 17, for example of metal, to which is thermally closely coupled, on the one hand, the sensor 13 and, on the other hand, a temperature setting member 19, such as a Peltier element. The output signal $S_{11}$ of sensor 13, dependent on the housing temperature of housing 11, is optionally processed and amplified in a unit 21, then introduced as the control variable X into a differentiating unit 23. The latter is fed, at a correcting variable input W, with an adjustable desired or governing value W, adjustable at an adjustable signal source 25. A control difference signal $\Delta$ is introduced via a controller 27 to the temperature adjusting member 19, such as a Peltier element, so that the temperature of the block 17 is set at a value corresponding to the desired value W set at unit 25. Thus, the housing temperature of the housing 11 is controlled constant with respect to time, and is known. On account of the relatively low inertia of housing 11 and block 17 regarding temperature fluctuations, the thermal stability of the housing 11 can be achieved rapidly so that after activation of the illustrated arrangement, a relevant measurement can first of all be conducted with regard to errors caused by thermal instabilities of housing 11. In this preferred version of the embodiments, which will also be described in greater detail below, the output $S_5$ of sensor 15, detecting the change in temperature evoked by the work of chopper 5, is introduced, together with the output S of the measuring sensor 1, into an evaluating unit 29, at the output of which a signal $S(\theta_3)$ appears which is representative for the radiation of the body 3 and is determined from a calculation of the measuring sensor output signal S and the output signal $S_5$ of the sensor 15. Attention is invited to FIG. 7, described further below, with respect to the realization of the evaluating unit.

Figure 6:
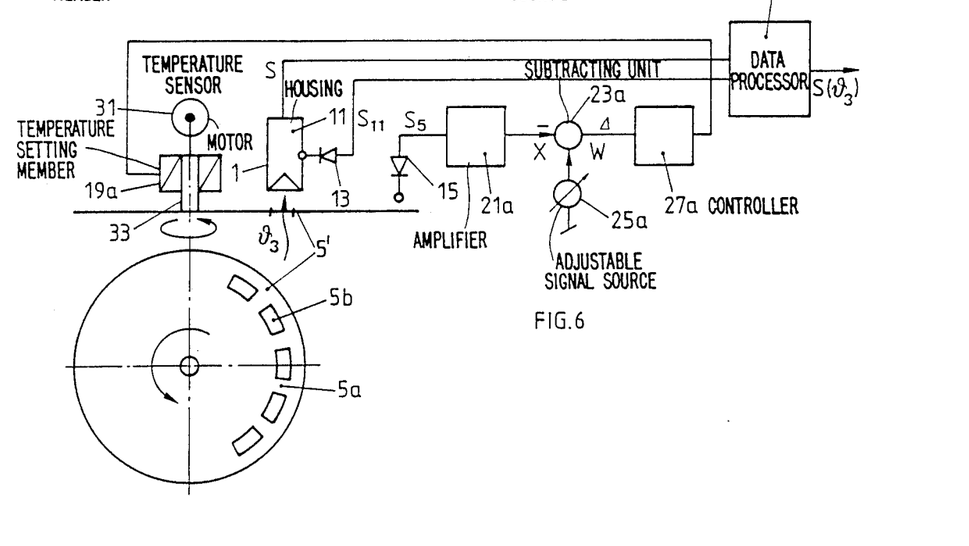
FIG. 6 is an illustration analogous to FIG. 5, but with a temperature-controlled chopper, and with correction of the measuring signal as a function of the housing temperature of the body radiation sensor.

FIG. 6 shows another version of an embodiment wherein the temperature is controlled in the zone of the path of motion of the chopper. A chopper disk 5', exhibiting segments 5a impermeable to heat radiation and segments 5b permeable to radiation, is usually employed, driven by means of a motor 31, as the chopper, for obtaining high chopper frequencies, not only in the version according to this figure, but also, if a mechanical chopper is used, in the remaining embodiments. In this version of the embodiments, the output of the sensor 15, measuring the temperature directly in the region of the travel path of chopper 5', is transmitted, optionally after amplification and processing in a unit 21a, as the control variable signal X to a differentiating unit 23a, the second input of which, in analogy to FIG. 5, is fed with a governing or desired value signal W settable at an adjustable signal source 25a. The control difference signal Δ appearing on the output side of differentiating unit 23a is then transmitted via a controller 27a to a temperature adjusting member 19a, such as, for example, a Peltier element acting on the disk shaft 33 closely coupled thermally with the chopper disk 5'. This control circuit is normally more inert than the one shown in FIG. 5, due to the thermal transfer inertia between shaft 33 and the periphery of disk 5' where, due to the high peripheral velocity, also the highest ambient temperatures arise so that the quick response of this control circuit is limited also for reasons of control stability.

Yet, in certain usage applications, and with a correspondingly small dimensioning of the chopper arrangement, this embodiment can be selected, optionally in addition to a control according to FIG. 5, especially in case an optoelectric chopper, such as a Kerr cell, is employed.

In this arrangement, and as illustrated in FIG. 6, the output $S_{11}$ of the temperature sensor 13, measuring the temperature of the sensor housing 11, is fed with the output S of the measuring sensor 1 to an evaluating unit 29a; at the output of the latter, a signal $S(\theta_3)$ appears, which is representative for the body radiation $\theta_3$.

Figure 7:
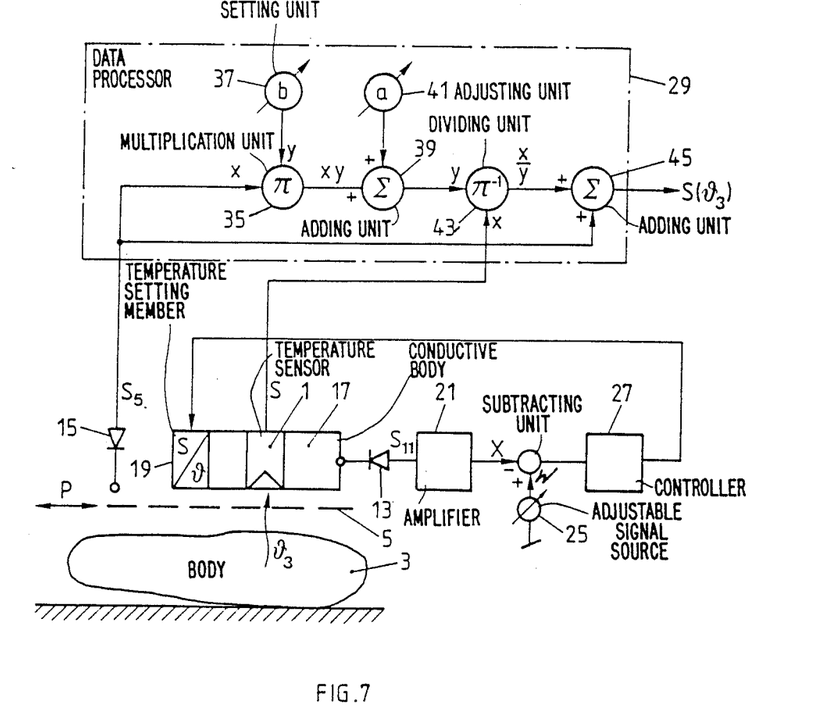
FIG. 7 shows schematically an arrangement according to FIG. 5 with the structure of an evaluating unit, represented by functional blocks.

The evaluating unit 29 is illustrated in FIG. 7 with the aid of functional blocks and based on the version according to FIG. 5.

The following expression is the starting point, at least in a first approximation, for the body temperature $\theta_3$ corresponding to the body radiation:

$$\theta_3 = \frac{\theta_1}{a + b\theta_5} + \theta_5$$

wherein $\theta_3$ means: the temperature prevailing at the location of the sensor 1 on account of the heat radiation of the body 3, $\theta_1$ means: the temperature measured by the sensor 1, corresponding to S, $\theta_5$ means: the temperature measured by means of the sensor 15 in the immediate range of the path of motion of the chopper 5, corresponding to $S_5$, a, b mean: coefficients and, respectively, constants to be determined empirically, dependent on the character of body 3 as well as the arrangement of chopper 5, sensor 1 and further facilities provided in the sensor/chopper zone.

In correspondence with this expression, the output signal of the sensor 15 at the evaluating unit 29 is first introduced into a multiplication unit 35; to the second input of the latter, the adjustable coefficient b is transmitted as the amplification factor. The coefficient b is adjusted at a setting unit 37 and stored therein. The output of the multiplication unit 35 is introduced into an adding unit 39; to the second input of the latter, the variable a, adjustable at an adjusting unit 41, is transmitted. The output of the adding unit 39 is transmitted to the denominator input of a dividing unit 43; the numerator input of the latter is fed with the output signal of the sensor 1. Finally, the output signal of the dividing unit 43 is added, in a summation unit 45, to the output signal of the sensor 15; on the output side of the adding unit 45 there appears a signal $S(\theta_3)$ representative for the temperature $\theta_3$ corresponding to the body radiation.

The coefficients a and b in the above-indicated equation, set at the evaluating unit 29, are determined empirically, for example, in such a way that, with at least two predetermined, constant body temperatures of the body 3 at respectively two different temperatures in the chopper zone, detected by means of sensor 15, the output signal of the evaluating unit 29 is adjusted, by means of the adjustable units 37 and 41, in such a way that the then appearing signal indicates the respective body temperature independently of the temperatures detected by means of sensor 15. Two differing temperatures detected by sensor 15 are produced, for example, by performing a first measurement immediately after activation of the chopper 5, and a respective second measurement after thermal stabilization of the temperature detected by means of the said sensor 15.

Figure 8:
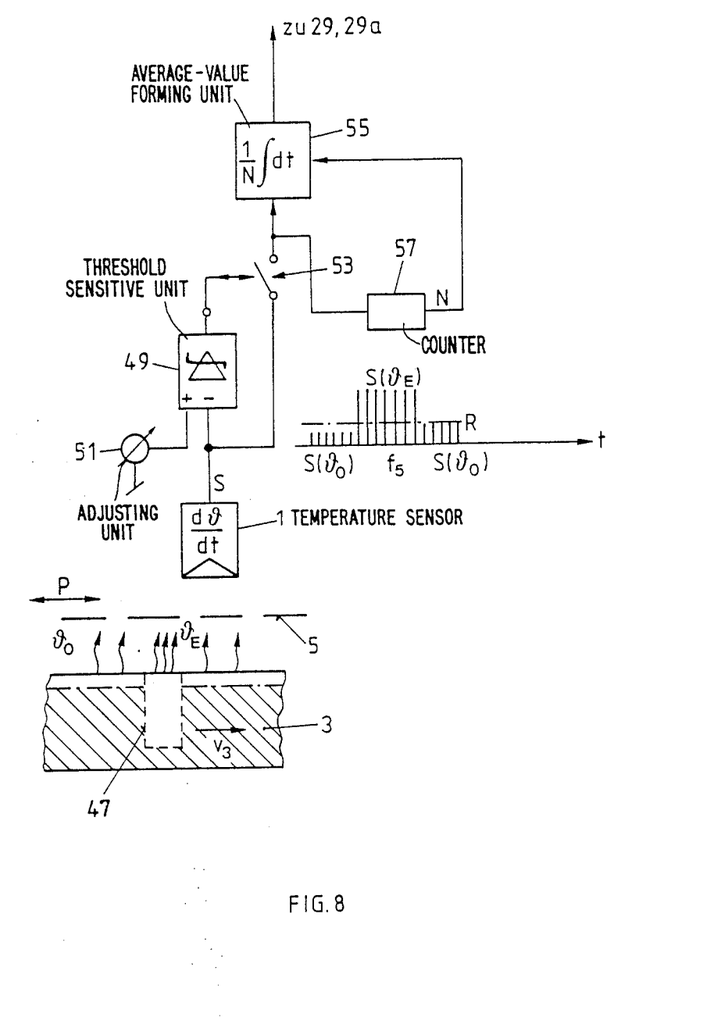
FIG. 8 shows, as a functional block diagram, the processing of the sensor output signal, as well as the detection of the point in time when a body to be measured, having the recess provided according to this invention, enters the measurement-relevant position.

A relatively accurate temperature measurement of heat radiation from a body surface, as described thus far, is, if the body is not isothermal, only representative for the thermal energy content of a relatively small volume element around the part of the body presently located in the zone of the measuring sensor 1. In many applications, however, it would be desirable to obtain, with such a temperature measurement, an indication of the thermal energy content of a substantially larger volume element, based on the position of the body with respect to the sensor 1. This can be achieved in a simple manner in all of the disclosed versions of the method by providing in the body 3 a recess, such as a bore 47, as illustrated in FIG. 8. The bore exhibits the thermal radiation of a black body and thus is representative for the thermal energy content of a substantially larger volume element of the body than in case merely its surface radiation is is detected. The exploitation of this feature is of extraordinary advantage, for example, in measuring the thermal energy condition of can bodies which, on a manufacturing line, are not as yet thermally equalized when they arrive at the temperature measuring point; this permits shortening of the production line if there is no need to wait for the can bodies to become isothermal. In this case, the opening in the can body is utilized directly as the aforementioned recess, and the temperature is measured in a noncontact fashion in the described way in the zone of the can body opening.

FIG. 8 shows a signal processing/evaluation connected directly after the sensor 1, making it possible to detect when such a body, moved with respect to the sensor 1, appears in a measurement-relevant position in the range of the sensor 1. The body 3, moving as indicated by the arrow $V_3$ and provided with the recess 47 to determine its thermal energy content by means of a temperature measurement of the aforedescribed type, emits at its surface a heat radiation corresponding to $\theta_0$, representative for the thermal energy content of the surface zone, as indicated qualitatively in dot-dash lines. In the zone of the recess 47, the body 3 emits the radiation corresponding to $\theta_E$ which is representative for the thermal energy content of a larger body volume element, as indicated qualitatively by shading. By means of the chopper 5, illustrated also schematically in FIG. 8, the body radiation is chopped up and impinges on the sensor 1. Usually, a pyroelectric detector is utilized as the sensor 1 which reacts to fluctuations in radiation per unit time, rather than temporally stationary radiation values. Also for this reason, it is essential to provide the chopper for measuring body radiations that do not change temporally. The qualitatively illustrated pulses appear at the output of sensor 1 at the chopper frequency $f_S$, these pulses being, as soon as the recess 47 arrives in the zone of the sensor 1, higher or lower than in the case where merely the surface, and consequently the radiation corresponding to $\theta_0$, is in the sensor range.

With the aid of a threshold-value-sensitive unit 49, connected after the sensor 1, such as a comparator with a threshold value R adjustable in an adjusting unit 51, a determination is made since when the output pulses of the sensor 1 deviate from a value corresponding to the surface radiation which corresponds to $\theta_0$. Then, by means of the threshold-value-sensitive unit 49, a switching element 53 is closed and the pulses occurring from that point in time on, $S(\theta_E)$, are transmitted to an average-value-forming unit 55 comprising, for example, an integrating element wherein the values of the presently received pulses are added up, the result being divided by the number N of received pulses, the latter being detected, for example, by means of a counter 57. The result of the average value formed in unit 55 is introduced in accordance with FIG. 7, 6, or 5 to the correspondingly provided evaluating unit 29 or 29a. The chopper period, inverse to the chopper frequency $f_S$, is selected so that it is substantially shorter than the time interval during which, at a given velocity $V_3$ of the body, the recess 47 is present in the range of sensor 1. By the average value formation in unit 55, incidental fluctuations of the pulses corresponding to $S(\theta_E)$ are averaged out. Furthermore, the threshold-value-sensitive unit 49 makes it possible to switch the arrangement to the active measuring mode, by way of the switch 53, at the exact instant when the body 3 is in a measurement-relevant position.

By means of the aforedescribed method according to this invention, and the above-described arrangement of this invention, it is possible to accurately measure in a noncontact fashion the temperature corresponding to the thermal radiation of a body, and to utilize this exact temperature measurement for measuring the thermal energy content of a large body volume element, by the provision of a recess in the body; accordingly, the method and arrangement make it feasible to obtain, for example in connection with hollow members that are not isothermal, such as cans on a production line, with the use of a single temperature measurement a representative value for their thermal energy content; this is of importance, for example, in testing such can bodies for leaks, where pressure drops relevant to leakages must be separated from pressure drops caused by the temperature, in other words where a temperature compensation of the pressure relevant at that point for measurement must be performed.

I claim:

1. A temperature measuring apparatus for a non-contact measurement of a temperature of a body, said apparatus comprising:
    a first temperature sensor means, having an input for receiving heat radiation, for generating an output signal dependent on heat radiation received from a direction towards said body;
    a heat radiation chopper means, disposed in front of said heat radiation receiving input of said first temperature sensor means located between said body and said first for chopping said heat radiation; and
    at least one second temperature sensor means arranged in an area adjacent said heat radiation chopper means and said first temperature sensor means, said area being disposed on a same side of said chopper means as said first temperature sensor means;
    wherein said second temperature sensor means generates a signal dependent on a temperature in said area; and
    wherein said output signal generated by said first temperature sensor is dependent on a temperature of said body and said signal generated by said second temperature sensor means is used for influencing said output signal to reduce its dependency on said temperature in said area.

2. A temperature measuring apparatus according to claim 1, wherein said at least one second temperature sensor means is closely thermally coupled with a housing means for housing said first temperature sensor means.

3. A temperature measuring apparatus according to claim 1, wherein said at least one second temperature sensor means is closely thermally coupled with said chopper means.

4. A temperature measuring apparatus according to claim 1, wherein said at least one second temperature sensor means is connected as a controlled variable pick up into a temperature feedback control circuit for feedback controlling a temperature in said area.

5. A temperature measuring apparatus according to claim 1, further comprising:
    mechanically moving chopper means included within said chopper means for chopping said heat radiation, and wherein said at least one second temperature sensor means is arranged adjacent to an area of a path of motion of said mechanically moving chopper means.

6. A temperature measuring apparatus according to claim 1, further comprising:
    evaluating means connected to receive outputs of at least said first and said at least one second temperature sensor means for evaluating said outputs by performing said influencing operation and providing said output signal which is dependent on said temperature of said body.

7. A temperature measuring apparatus according to claim 1, wherein:
said at least one second temperature sensor means is located adjacent said chopper means;
said signal generated by said second temperature sensor means being fed to a first input of a multiplication unit;
a signal of an adjustable value being fed to a second input of said multiplication unit;
an output signal of said multiplication unit being fed to a first input of a summation unit;
an adjustable value signal being fed to a second input of said summation unit;
said output signal of said first temperature sensor means being transmitted to a numerator input of a dividing unit;
a denominator input of said dividing unit being fed with an output signal of said summation unit; and
wherein an output signal of said dividing unit as well as said signal generated by said second temperature sensor means are transmitted to a further summation unit an output of which being connected to be provided as said output signal which is dependent on said temperature of said body.

8. A measuring apparatus according to claim 7, further comprising:
storage means for storing said adjustable value signals, said storage means being connected to said second inputs of said multiplication unit and of said summation unit respectively.

9. A measuring apparatus according to claim 1, wherein said output signal of said first temperature sensor means is fed to average-value-forming means having an averaging time longer than that of the chopper period of said chopper means.

10. A temperature measuring apparatus according to claim 1, wherein said output signal of said first temperature sensor means being fed to threshold-value-sensitive means, an output of said threshold-value-sensitive means operatively connecting said output of said first temperature sensor means to be provided as said output signal which is dependent on said temperature of said body after said value of said output signal of said first temperature sensor means crosses a predetermined threshold level of said threshold-value-sensitive means.

11. A temperature measuring apparatus according to claim 10, wherein said threshold-value-sensitive means is adapted to respond to a predetermined change of input signal per unit time.

12. A temperature measuring apparatus according to claim 1, wherein said first temperature sensor means generates an output signal dependent on a change of heat radiation per time unit at said input for heat radiation.

13. A method of non-contact measurement of a temperature of a body, comprising the steps of:
placing temperature sensor means adjacent to said body and measuring a temperature adjacent said body;
providing chopper means for chopping thermal radiation emitted by said body between said body and said temperature sensor means; said chopper means as measuring a temperature of an area, wherein said area is on a same side of said temperature sensor means; and using said additionally measured temperature to evaluate from an output signal of said temperature sensor means said temperature of said body.

14. A method according to claim 13, wherein said step of measuring said temperature of said area includes the step of:
measuring a temperature of a housing means in accordance with said sensor means.

15. A method according to claim 13, wherein said step of measuring said temperature of said area includes the step of:
measuring a temperature in an area adjacent said chopper means resulting from heat generated by operation of said chopper means.

16. A method according to claim 13, further comprising the step of:
feed back controlling said temperature of said area to a predetermined value.

17. A method according to claim 13, wherein:
a mechanically moved chopper means is provided in said chopper means to intermittently interrupt said heat radiation; and
wherein the step of measuring said temperature of said area includes the step of measuring a temperature in an area adjacent a travel path of said mechanically moved chopper means.

18. A method according to claim 13, wherein the step of measuring said temperature of said area includes the step of:
measuring a temperature in an area adjacent said chopper means; and
wherein a temperature d by said temperature sensor means is corrected as a function of said temperature measured at said area adjacent said chopper means.

19. A method according to claim 18, further comprising the steps of:
multiplying a first signal dependent on said temperature measured at said area by a first coefficient;
adding a result of said multiplication to a second coefficient to obtain a second signal;
dividing said output signal of said temperature sensor means by said second signal in order to obtain a third signal; and
adding said third signal to said first signal to obtain a signal representing temperature of said body.

20. A method according to claim 19, further comprising the step of:
empirically determining said first and second coefficients from at least two measurements at a predetermined body temperature and two values of said temperature measured at said area, adjacent said chopper means, and storing said first and second coefficients.

21. A method according to claim 13, further comprising the step of:
averaging an output signal from said temperature sensor means over a plurality of chopper periods of said chopper means prior to a further evaluation.

22. A method according to claim 13, further comprising the step of:
enlarging a body volume element of which the temperature measurement is representative for its thermal energy content;
wherein the step of measuring a temperature adjacent said body by the temperature sensor means is effected in an area of a recess provided in said body, said recess being already in existence in said body or provided therein for the purpose of temperature measurements.

23. A method according to claim 13, further comprising the step of:

moving the body relative to said temperature sensor means; and wherein a chopper period of said chopper means for chopping said thermal radiation is less than a time span during which the recess is within a measuring range of said sensor means.

* * * * *